United States Patent
Patil et al.

(10) Patent No.: US 12,496,173 B2
(45) Date of Patent: Dec. 16, 2025

(54) METHOD FOR COLORING A DENTAL PROSTHESIS

(71) Applicant: James R. Glidewell Dental Ceramics, Inc., Newport Beach, CA (US)

(72) Inventors: Kunal A. Patil, Irvine, CA (US); Babak Manafighazani, Rancho Santa Margarita, CA (US); David C. Leeson, Laguna Beach, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 972 days.

(21) Appl. No.: 16/950,504

(22) Filed: Nov. 17, 2020

(65) Prior Publication Data

US 2022/0151748 A1  May 19, 2022

(51) Int. Cl.
| | | |
|---|---|---|
| *A61C 13/08* | (2006.01) | |
| *A61C 13/00* | (2006.01) | |
| *B33Y 10/00* | (2015.01) | |
| *B33Y 30/00* | (2015.01) | |
| *B33Y 80/00* | (2015.01) | |

(52) U.S. Cl.
CPC ........ *A61C 13/082* (2013.01); *A61C 13/0004* (2013.01); *B33Y 10/00* (2014.12); *B33Y 30/00* (2014.12)

(58) Field of Classification Search
CPC ... A61C 13/082; A61C 13/0004; A61C 13/08; B33Y 10/00; B33Y 30/00; B33Y 80/00
See application file for complete search history.

(56) References Cited

U.S. PATENT DOCUMENTS

| | | | | |
|---|---|---|---|---|
| 4,189,325 | A | * | 2/1980 | Barrett ................ C03C 10/0027 106/35 |
| 4,351,853 | A | | 9/1982 | Jochum et al. |
| 4,534,839 | A | * | 8/1985 | Schaefer ................ A61K 6/887 522/63 |
| 4,626,514 | A | * | 12/1986 | Watanabe ................ A61K 6/16 106/35 |
| 4,654,007 | A | * | 3/1987 | Sigler ....................... A61K 6/30 433/226 |
| 4,799,887 | A | * | 1/1989 | Hakamatsuka ........ A61C 13/20 501/3 |

(Continued)

FOREIGN PATENT DOCUMENTS

| | | | | |
|---|---|---|---|---|
| CN | 105431296 B | * | 6/2018 | .......... B41J 2/14282 |
| EP | 0311214 A1 | | 4/1989 | |

(Continued)

*Primary Examiner* — Bayan Salone
(74) *Attorney, Agent, or Firm* — Klarquist Sparkman, LLP

(57) ABSTRACT

Disclosed are example embodiments of methods and systems for automatically coloring a dental prosthesis. One of the systems includes: a memory configured to store a computer-aided manufacturing (CAM) file of the dental prosthesis; a holding apparatus for securing the dental prosthesis; one or more outlets for dispensing coloring fluid; an coloring fluid controller configured to control the one or more outlets to dispense coloring fluid at a preset size and frequency based at least on the CAM file; and a motion controller configured to move the holding apparatus or the one or more outlets based at least on the CAM file.

13 Claims, 12 Drawing Sheets

(56) References Cited

U.S. PATENT DOCUMENTS

| | | | |
|---|---|---|---|
| 5,104,319 A * | 4/1992 | Evans | A61K 6/816 433/223 |
| 5,171,147 A * | 12/1992 | Burgess | A61K 6/887 433/180 |
| 5,240,414 A * | 8/1993 | Thompson | A61C 19/10 433/26 |
| 5,248,258 A * | 9/1993 | Feldman | A61C 13/0004 433/223 |
| 5,263,858 A * | 11/1993 | Yoshida | C04B 35/486 433/8 |
| 5,308,243 A * | 5/1994 | Emmons | A61C 5/77 433/218 |
| 5,382,164 A * | 1/1995 | Stern | A61C 13/0004 433/213 |
| 5,501,600 A * | 3/1996 | Johnson | A61C 13/0003 433/223 |
| 5,549,476 A * | 8/1996 | Stern | G16H 20/40 433/213 |
| 5,565,152 A * | 10/1996 | Od en | A61C 5/77 427/2.27 |
| 5,993,214 A * | 11/1999 | Persson | A61C 13/0003 433/223 |
| 6,033,222 A * | 3/2000 | Schneider, II | A61C 13/082 264/20 |
| 6,133,174 A * | 10/2000 | Brodkin | A61K 6/816 106/35 |
| 6,322,728 B1 * | 11/2001 | Brodkin | A61K 6/838 264/603 |
| 6,328,567 B1 * | 12/2001 | Morris | G01J 3/0264 433/203.1 |
| 6,334,775 B2 * | 1/2002 | Xu | A61K 6/889 433/224 |
| 6,354,836 B1 * | 3/2002 | Panzera | A61C 13/0022 433/223 |
| 6,358,047 B2 * | 3/2002 | Lehmann | G01J 3/463 356/408 |
| 6,375,729 B1 * | 4/2002 | Brodkin | A61K 6/20 264/16 |
| 6,379,593 B1 * | 4/2002 | Datzmann | A61C 13/08 264/16 |
| 6,428,614 B1 * | 8/2002 | Brodkin | A61K 6/17 106/35 |
| 6,455,451 B1 * | 9/2002 | Brodkin | A61K 6/818 264/16 |
| 6,465,106 B1 * | 10/2002 | Petticrew | C03C 10/00 501/7 |
| 6,485,849 B2 * | 11/2002 | Petticrew | C03C 4/0021 106/35 |
| 6,488,503 B1 * | 12/2002 | Lichkus | A61C 13/20 433/202.1 |
| 6,575,751 B1 * | 6/2003 | Lehmann | G16H 50/50 433/223 |
| 6,599,125 B1 * | 7/2003 | Freilich | A61C 13/0003 433/180 |
| 6,645,285 B2 * | 11/2003 | Brodkin | A61K 6/77 106/35 |
| 6,666,684 B1 | 12/2003 | Names | |
| 6,755,646 B2 | 6/2004 | Zun | |
| 6,761,760 B2 | 7/2004 | Brodkin et al. | |
| 6,786,726 B2 | 9/2004 | Lehmann et al. | |
| 6,808,659 B2 | 10/2004 | Schulman et al. | |
| 6,818,573 B2 | 11/2004 | Petticrew | |
| 6,821,462 B2 | 11/2004 | Schulman et al. | |
| 6,878,456 B2 | 4/2005 | Castro et al. | |
| 6,979,496 B2 | 12/2005 | Haymann et al. | |
| 6,984,261 B2 | 1/2006 | Cummings et al. | |
| 6,994,545 B2 | 2/2006 | Mrotzek et al. | |
| 7,011,522 B2 | 3/2006 | Panzera et al. | |
| 7,029,279 B2 | 4/2006 | Schomann | |
| 7,064,830 B2 | 6/2006 | Giorgianni et al. | |
| 7,149,089 B2 | 12/2006 | Blasko et al. | |
| 7,153,135 B1 | 12/2006 | Thomas | |
| 7,166,256 B2 | 1/2007 | Lindigkeit | |
| 7,179,089 B2 | 2/2007 | Sims et al. | |
| 7,279,238 B2 | 10/2007 | Brodkin | |
| 7,351,281 B2 | 4/2008 | Hermansson et al. | |
| 7,463,757 B2 | 12/2008 | Luo et al. | |
| 7,494,539 B2 | 2/2009 | Kushima et al. | |
| 7,497,983 B2 | 3/2009 | Khan et al. | |
| 7,581,953 B2 | 9/2009 | Lehmann et al. | |
| 7,790,073 B2 | 9/2010 | Culp | |
| 7,955,159 B2 | 6/2011 | Heinz et al. | |
| 8,052,424 B2 | 11/2011 | Cameron et al. | |
| 8,105,084 B2 | 1/2012 | Lehmann et al. | |
| 8,110,035 B2 | 2/2012 | Chu et al. | |
| 9,060,832 B2 * | 6/2015 | Karim | A61C 13/0019 |
| 10,022,206 B2 | 7/2018 | Karlsson et al. | |
| 10,387,746 B2 | 8/2019 | Carney et al. | |
| 10,518,551 B1 * | 12/2019 | McConville | B41J 2/1721 |
| 2001/0049083 A1 | 12/2001 | Jung et al. | |
| 2002/0064745 A1 | 5/2002 | Schulman et al. | |
| 2003/0011768 A1 * | 1/2003 | Jung | G01J 3/0283 356/326 |
| 2003/0031984 A1 | 2/2003 | Rusin et al. | |
| 2004/0067465 A1 | 4/2004 | Schomann | |
| 2004/0214141 A1 | 10/2004 | Neuber | |
| 2004/0224278 A1 | 11/2004 | Zun | |
| 2004/0232576 A1 | 11/2004 | Brodkin et al. | |
| 2004/0243481 A1 | 12/2004 | Bradbury et al. | |
| 2005/0064369 A1 | 3/2005 | Zel et al. | |
| 2005/0112522 A1 | 5/2005 | Riley et al. | |
| 2005/0115460 A1 | 6/2005 | Petticrew | |
| 2005/0123880 A1 | 6/2005 | Grundler et al. | |
| 2005/0181330 A1 | 8/2005 | Kim et al. | |
| 2005/0202368 A1 | 9/2005 | Ganley | |
| 2005/0261795 A1 | 11/2005 | Ghosh et al. | |
| 2006/0099552 A1 | 5/2006 | van der Zel et al. | |
| 2006/0172263 A1 | 8/2006 | Quadling et al. | |
| 2006/0204932 A1 | 9/2006 | Haymann et al. | |
| 2006/0290019 A1 | 12/2006 | Neuber | |
| 2007/0003908 A1 | 1/2007 | Porter | |
| 2007/0062410 A1 | 3/2007 | Thiel et al. | |
| 2008/0050699 A1 | 2/2008 | Zhang et al. | |
| 2008/0164254 A1 | 7/2008 | Hegenbarth | |
| 2008/0199826 A1 | 8/2008 | Jia et al. | |
| 2008/0254412 A1 | 10/2008 | Korrodi et al. | |
| 2008/0318189 A1 | 12/2008 | Brodkin et al. | |
| 2009/0004630 A1 | 1/2009 | van der Zel et al. | |
| 2009/0023112 A1 | 1/2009 | Ganley et al. | |
| 2009/0087815 A1 | 4/2009 | Oyama et al. | |
| 2009/0130634 A1 | 5/2009 | Ganley et al. | |
| 2009/0168063 A1 | 7/2009 | Kobayashi | |
| 2009/0227438 A1 | 9/2009 | Fukatani et al. | |
| 2009/0274994 A1 | 11/2009 | Jung et al. | |
| 2009/0275000 A1 | 11/2009 | Jung et al. | |
| 2009/0298017 A1 | 12/2009 | Boerjes et al. | |
| 2010/0015574 A1 | 1/2010 | van der Zel et al. | |
| 2010/0173257 A1 | 7/2010 | Yamamoto et al. | |
| 2010/0221682 A1 | 9/2010 | Burger et al. | |
| 2010/0221683 A1 | 9/2010 | Franke et al. | |
| 2010/0233655 A1 * | 9/2010 | Karim | A61C 13/0009 433/172 |
| 2010/0233658 A1 | 9/2010 | Ganley et al. | |
| 2010/0297586 A1 | 11/2010 | Culp | |
| 2011/0104642 A1 | 5/2011 | Luksch et al. | |
| 2011/0104643 A1 | 5/2011 | Giordano | |
| 2011/0171604 A1 | 7/2011 | Durbin et al. | |
| 2011/0183297 A1 | 7/2011 | Thiel et al. | |
| 2011/0200966 A1 | 8/2011 | Heinz et al. | |
| 2011/0244429 A1 | 10/2011 | Waizenegger et al. | |
| 2011/0256507 A1 | 10/2011 | Chiu et al. | |
| 2011/0306017 A1 | 12/2011 | Tanaka | |
| 2012/0015328 A1 | 1/2012 | Giasson et al. | |
| 2019/0125503 A1 * | 5/2019 | Krolikowski | B33Y 70/00 |
| 2019/0274797 A1 | 9/2019 | Meyer | |
| 2022/0219191 A1 * | 7/2022 | Shibatani | B05B 1/08 |

FOREIGN PATENT DOCUMENTS

| | | | |
|---|---|---|---|
| EP | 0774933 A1 | 5/1997 | |
| EP | 1252867 A1 * | 10/2002 | B33Y 80/00 |

(56) References Cited

FOREIGN PATENT DOCUMENTS

| EP | 1396237 A1 | 3/2004 | |
|---|---|---|---|
| EP | 1927325 A1 | 6/2008 | |
| EP | 1972298 A1 | 9/2008 | |
| EP | 2361601 A1 | 8/2011 | |
| EP | 3235467 A1 * | 10/2017 | ............. A61C 13/09 |
| JP | 2003340813 A | 12/2003 | |
| JP | 2018038551 A * | 3/2018 | ............. A61C 13/00 |
| JP | 2020195508 A * | 12/2020 | ............... B05D 1/02 |
| SE | 501333 C2 | 1/1995 | |
| WO | 02085241 A1 | 10/2002 | |
| WO | 03061513 A1 | 7/2003 | |
| WO | WO-2006036114 A1 * | 4/2006 | ......... A61C 13/0003 |
| WO | 2007053084 A1 | 5/2007 | |
| WO | 2009111041 A1 | 9/2009 | |

\* cited by examiner

METHOD FOR COLORING A DENTAL PROSTHESIS

TECHNICAL FIELD

The disclosure relates generally to the field of dental prosthetics, specifically and not by way of limitation, some embodiments are related to systems and methods for coloring a dental prosthesis.

BACKGROUND

Damaged, unattractive, or diseased natural tooth is typically replaced with a crown, bridge, veneer, or prosthetic tooth. In replacing the natural tooth, the goal is to provide the patient with a natural-looking prosthesis such that it is unnoticeable. To accomplish this feat, the dental practitioner must provide a prosthesis having the appropriate shape, size, and color for the patient. Ideally, the prosthesis would have the exact color and shade as the original so it would blend with the surrounding teeth.

Recently, there have been significant advances in materials and manufacturing processes in the field of dental restoratives. However, the coloring and shading process of a dental prosthesis has remained largely unchanged for decades. The standard coloring and shading process used by most dentists is to color match a sample of a shade guide to one of the patient's real teeth.

The most commonly used shade guide has sixteen shade tabs, which are divided into four basic color groups. Those four groups are: reddish-brown, having five tabs; reddish-yellow, having four tabs; grey, having four tabs; and reddish-grey, having three tabs. To find the best shade for a patient, the dental practitioner would place one of the tabs next to the patient's tooth and perform a visual comparison until the best match is found. Each tab can have a color code or value (e.g., A1, A4, D4) to indicate the shade.

After the best color match had been selected, the dental practitioner would record the color value of the matched tab and send it to the dental lab where the patient's dental prosthesis will be manually colored by a ceramic artist. Quite literally, the ceramic artist would paint the patient's dental prosthesis with paintbrushes and an assortment of coloring solutions. The process is manual and very labor intensive, and heavily relies on the individual skills of the ceramic artist. As such, the coloring process has a lot of variables such as: differences in the color perception of each ceramic artist, environment or lighting differences, paintbrushes attributes, amount of coloring solution applied, paint coating homogeneity, etc. Some of these variables are uncontrollable regardless of how much engineering and quality controls are placed into the manual coloring process. For example, over a long period of time, different operators have different working styles and mode of painting regardless of established standards. Each operator will invariably apply different stroke patterns, amount of paint used, combination of colors used, etc. Not only these variables differ greatly among different operators, they can also differ at the individual operator level. As a result, the dental prosthesis coloring process is very difficult to control and consistent quality across various coloring lines is very difficult to achieve. Accordingly, what is needed is an automated coloring process that can produce quality and consistent dental prosthesis coloring.

SUMMARY

Disclosed are example embodiments of methods and systems for automatically coloring a dental prosthesis. One of the systems includes: a memory configured to store a computer-aided manufacturing (CAM) file of the dental prosthesis; a holding apparatus for securing the dental prosthesis; one or more outlets for dispensing coloring fluid; an coloring fluid controller configured to control the one or more outlets to dispense coloring fluid at a preset size and frequency based at least on the CAM file; and a motion controller configured to move the holding apparatus or the one or more outlets based at least on the CAM file. The movement of the holding apparatus and/or the one or more outlets can include a translation, a rotation, or a combination of translation and rotation. The translation and rotation of the holding apparatus and/or the one or more outlets enable the dispensed coloring fluid to land substantially perpendicular on a target area of the dental prosthesis.

The system can also include a mechanical-motion assembly configured to move the holding apparatus or the one or more outlets. The mechanical-motion assembly includes one or more motors that can be controlled by the motion controller via controlling the mechanical-motion assembly using instructions (e.g., commands) from the CAM file of the dental prosthesis. The CAM file can include data that define the printing path, coloring fluid drop size, coloring fluid dispensing frequency, and motion commands.

The coloring fluid drop size and motion commands can be specified at each print location of the printing path. In some embodiments, the coloring fluid drop size is configured to be the smallest near the occlusal surface of the dental prosthesis and the largest near the gumline area of the dental prosthesis. The coloring fluid and motion controllers can be the same controller or they can be independent of each other.

The system can also include a color reader configured to determine a color profile of a sample; and a CAM-file generator configured to generate the CAM file of the dental prosthesis based at least on a dentition profile of a patient and the color profile of the sample. The CAM file is generated such that the color profile is re-created on the dental prosthesis when instructions in the CAM file are executed.

The CAM-file generator can also be configured to retrieve the dentition profile of the patient from a dentition database. The dentition profile can be a digital model of the dental prosthesis.

In some embodiments, the color profile is re-created on the dental prosthesis by assigning a color value to each cell of a color grid of the sample and transferring the color value of each cell to a cell of a color grid of the dental prosthesis. The one or more outlets of the disclosed system can be coupled to a first, second, and a third coloring fluid cartridges. The first coloring fluid cartridge can have a red-based color. The second coloring fluid cartridge can have a green-based color, and the third coloring fluid cartridge can have a blue-based color. In some embodiments, the coloring fluid is a colorless ink until it is exposed to heat, which brings out the color.

A method for automatically coloring a dental prosthesis is also disclosed. The method includes: retrieving a computer-aided manufacturing (CAM) file for the dental prosthesis; moving the dental prosthesis with respect to a printing nozzle based on instructions from the CAM file; and dispensing coloring fluid on the dental prosthesis based at least on instructions from the CAM file. Moving the dental prosthesis can include translating, rotating, or a combination of both movements.

In the above method, dispensing the coloring fluid can include dispensing the coloring fluid having an coloring fluid drop size based at least on a print location of the printing path. The coloring fluid drop size can be smallest near the occlusal surface of the dental prosthesis and largest near the gumline area of the dental prosthesis.

The method also includes: determining, using a color reader, a color profile of a sample; and generating the CAM file of the dental prosthesis, based at least on a dentition profile of a patient and the color profile of the sample. Generating the CAM file can include: assigning a color value to each cell of a color grid of the sample; and transferring the color value of each cell to a cell of a color grid that is overlaid on the digital model of the dental prosthesis.

A second method for automatically coloring a dental prosthesis is disclosed. The second method includes: generating a computer-aided manufacturing (CAM) profile for the dental prosthesis using a color profile received from a user and a dentition profile of a patient; inserting the dental prosthesis into a holder of the printer; moving the dental prosthesis or one or more printing outlets of the printer based on instructions from the CAM profile; and dispensing coloring fluid from the one or more printing outlets based on the CAM profile of the dental prosthesis.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Overview

The process of coloring a dental prosthesis includes two unreliable steps due to their dependence on the perception of the individuals performing the steps. The first unreliable step is the color matching process where a dental practitioner determines a color value (e.g., color and shade) the dental prosthesis should have. This is typically done by comparing a sample of a color guide with one or more of the patient's teeth. The process is not an exact science since it is highly dependent on the dental practitioner's judgment and perception on which sample from the many samples of the color guide best matches the patient's teeth. The color matching process can vary from person to person and even from the same person due to factors such as eye fatigue and lighting.

The second unreliable step is the coloring of the dental prosthesis, which is manually painted. The coloring process is very labor intensive and can vary greatly because it is an artform rather than an exact science. Currently, a dental prosthesis is colored by a ceramic artist (e.g., a ceramist of a dental laboratory). The toolset of a ceramic artist for painting a dental prosthesis consists of many paintbrushes, 16 or more different coloring solutions, and glaze solutions. Given a color value, the ceramic artist would use his/her own judgement and perception to apply various colors and/or glaze solutions to paint the dental prosthesis. Because the process is an art, the final results can vary day-to-day or even hour-to-hour.

The disclosed auto coloring system and method (or simply the system) is designed to deliver consistent and esthetically looking colored dental prostheses by transforming the two highly unreliable steps into a predictable and repeatable coloring process. The disclosed auto coloring system can employ an auto coloring process after receiving a color value input from the dental practitioner. Alternatively, the disclosed auto coloring system can also perform automatic color matching by scanning a sample (e.g., a picture, an extracted tooth) or by directly scanning one or more of the patient's teeth. In this way, the variability of the color matching process that is typically performed through visual inspection is reduced—or even eliminated.

Figure 1:
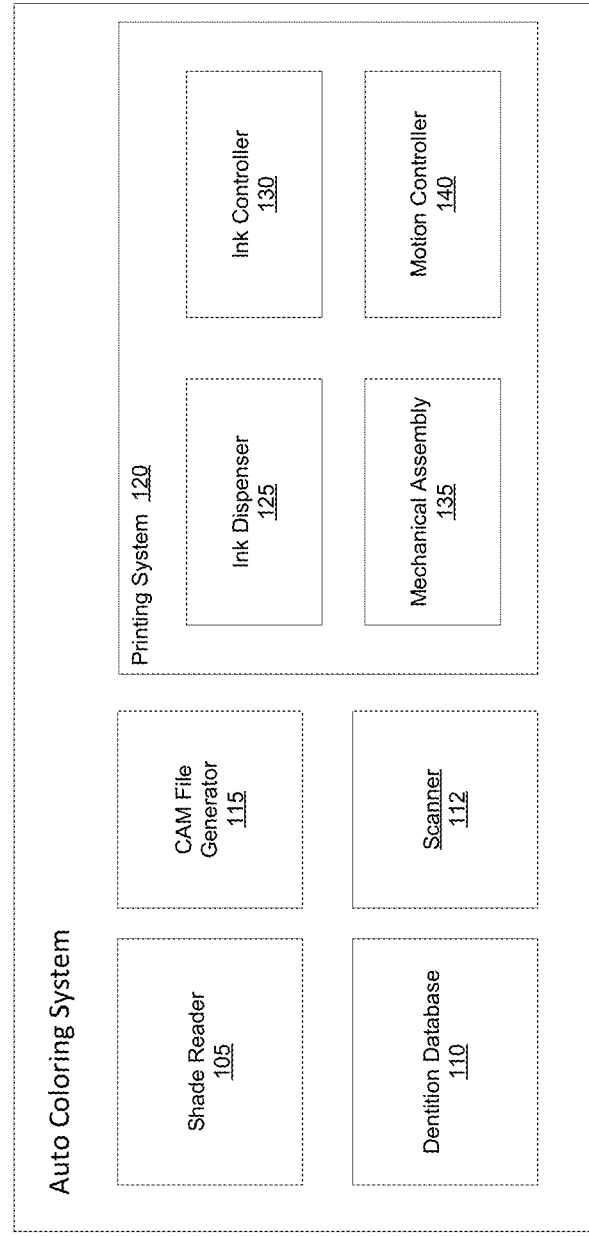
FIG. 1 is a block diagram of auto coloring system in accordance with some embodiments of the present disclosure.

FIG. 1 discloses an auto coloring system 100 in accordance with some embodiments of the present disclosure. System 100 includes a color reader 105, a dentition database 110, scanner 112, a CAM (computer-aided manufacturing) file generator 115, and a printing system 120. Color reader 105 can be a handheld reader configured to scan a tooth and output a color value of the scanned tooth. Color reader 105 can be operated at the dental office by a dental practitioner. Alternatively, color reader 105 can be an integrated part of printing system 120. In this embodiment, color reader 105 can scan an extracted tooth that would be replaced by the dental prosthesis being fabricated. Color reader 105 can be configured to output a single color value or multiple color values for various sections of the scanned sample (e.g., extracted tooth, adjacent tooth).

Color reader 105 can scan a tooth or a high resolution picture of a tooth and output a color profile for the tooth (or picture). The color profile can include color data to characterize the color using units such as, but not limited to, color frequency (e.g., 700 THz), color wavelength (e.g., 400 nm), RGB (Red, Green Blue) value (e.g., 51, 255, 51), HSL value (hue, saturation, and lightness), and an overall shade value (e.g., A2). The color profile can include color data at different resolutions. For example, color reader 105 can scan a tooth using a 100×100 pixel resolution color grid. For each cell of the color grid, color reader 105 can scan the tooth and assign a specific color value (e.g., RGB, shade) to the cell. The grid can have various sizes such as, but not limited to, 1×1, 2×2, 5×5, 10×20, 200×350, 4400×8000. The grid can also have different shape such as, but not limited to, a circle, a rectangle, or other irregular shapes. In some embodiments, color reader 105 can output a single shade/color value based on the plurality of color readings. For example, color reader 105 can average all of the color values from the color grid to output a single color value that is familiar to the dental practitioner (e.g., A2). In some embodiments, the color profile can also have one or more classical shade values (e.g., A1, D2) for each scanned sample.

Dentition database 110 can be a local or a remote database containing dentition data of each patient. The dentition data can include a scanned 3D model of a patient's mouth and one or more digital models of dental prosthesis (e.g., crowns, bridges). Dentition database 110 can also include previously scanned color value(s) of each tooth of the patient. In this way, when a tooth is damaged, extracted, or lost, the dental practitioner can retrieve the color value(s) of the tooth. This may eliminate the need to perform the color matching process. Alternatively, the stored color value(s) can be used as a point of reference for new color readings since the color of a tooth can change over time.

Scanner 112 can be a contact or non-contact 3D scanner that can scan a dental prosthesis and generate a 3D data model of the dental prosthesis. The scanner can use light or radio waves to scan a dental prosthesis and generate a 3D data set of the scanned dental prosthesis. Scanner 112 can output a 3D data set having a stereolithography CAD format known as STL. Scanner 112 can also generate other types of 3D data set format such as 3DS, BLEN, SCL, or SKP.

CAM file generator 115 can be a software that uses one or more color values and a 3D model of a dental prosthesis to generate a CAM file that defines how the dental prosthesis is colored. The CAM file can include data that define the printing path, printing location along the printing path (or coloring fluid dispensing frequency), coloring fluid drop size, coloring fluid drop volume, coloring fluid color or coloring fluid cartridge to be used, and motion commands, which are commands that control how the dental prosthesis is to be translated, rotated, or a combination of both with respect to one or more coloring fluid outlets. The motion commands can also control the movement (e.g., translation, rotation) of the one or more coloring fluid outlets with respect to a dental prosthesis holder.

CAM file generator 115 can be configured to automatically design a printing path based at least on a 3D model of the patient's dental prosthesis. The designed printing path for the 3D model of the dental prosthesis can also be refined and edited by a human designer prior to finalizing the CAM file. Although referred to as a CAM file, the format of the file is not limited to the .CAM file extension. The file generated by CAM file generator 115 can have other formats such as, but not limited to, IGES, CADL, DFX, ASCII, and NCAL.

Once the CAM file is generated for the dental prosthesis, it can be uploaded to printing system 120, which can reside at a dental laboratory or at the dental office (e.g., chair-side system). In the chair-side implementation, CAM file generator 115 can reside locally. Alternatively, CAM file generator 115 can reside at a remote dental laboratory that specializes in coloring dental prosthesis and designing CAM file to fabricate the same. Once the CAM file is generated it can be associated with a patient's ID and stored in dentition database 110 for later retrieval.

Printing system 120 includes coloring fluid dispenser 125, coloring fluid controller 130, mechanical assembly 135, and motion controller 140. Coloring fluid dispenser 125 includes one or more coloring fluid outlets, each coupled to one or more coloring fluid cartridges. Coloring fluid dispenser 125 can be configured to dispense many different colors such as, but not limited to, gray, yellow, while, red, green, and blue. Coloring fluid dispenser 125 can be configured to dispense various combinations of three main foundation colors such as red, green, and blue to produce millions of different colors. The coloring fluid can be a colorless ink that only turns into a desired color once it is exposed to heat such as during a sintering process. For example, the coloring fluid for the color red can be colorless until it is exposed to heat. Once the coloring fluid is exposed to heat for a certain amount of time, the true color of the fluid comes out. Similarly, the coloring fluid for blue can be colorless once it is applied to the surface of a dental prosthesis. However, once the dental prosthesis goes through a sintering process, the colorless coloring fluid becomes blue or a shade of blue as designed.

Coloring fluid dispenser 125 can also be configured to dispense other types of fluid such as, but not limited, glazing solutions, whitening solutions, solutions containing yttria or tantalum, or other type of chemical solutions to change the translucency and/or the material properties of the dental prosthesis. Examples of other types of solutions that are able to be dispensed from the coloring fluid dispenser 125 in alternative embodiments of the printing system 120 include those described in the following patent applications, which are hereby incorporated by reference in their entireties: U.S. Patent Application Pub. No. 2018/0265420, published on Sep. 20, 2018 and titled "Method for Enhancing Optical Properties in Ceramics Having Applications in Dental Restorations," U.S. Patent Application Pub. No. 2018/0263863, published on Sep. 20, 2018 and titled "Method for Enhancing Optical and Strength Properties in Ceramic Bodies Having Applications in Dental Restorations," and U.S. Provisional Patent Application Ser. No. 63/077,935, filed Sep. 14, 2020 and titled "Method for Enhancing Mechanical Properties in Sintered Ceramic Bodies Having Applications in Dental Restorations."

In some embodiments, coloring fluid dispenser 125 can dispense a colorless coloring fluid (e.g., coloring fluid) having oxide(s) or other type of reagents that would turn the colorless coloring fluid into a desired color once exposed to heat or being sintered. Similar to the foundation colors RGB, a combination of foundation colorless coloring fluids can also be employed.

Coloring fluid controller 130 is configured to control coloring fluid dispenser 125 to control the size of the coloring fluid drop, the source of the coloring fluid or fluid (e.g., yellow coloring fluid cartridge), and the dispensing frequency based at least on instructions from the CAM file.

Mechanical assembly 135 can include a holding apparatus to securely hold the dental prosthesis during the coloring process. Holding apparatus can be a device that securely holds the dental prosthesis in place. The device can be, but not limited to, clamps, mechanical fingers, and vacuum holder. Mechanical assembly 135 is configured to have a full range of motion and rotation. For example, mechanical assembly 135 can translate the dental prosthesis in the x, y, and z directions and can also rotate the dental prosthesis by 360 degrees. Mechanical assembly 135 can also be configured to translate and rotate one or more coloring fluid outlets with respect to the dental prosthesis. In some embodiments, mechanical assembly can be a robotic holding apparatus with full translational and rotational motion.

Motion control 140 is configured to control mechanical assembly 135 in order to translate the dental prosthesis and/or one or more coloring fluid outlets in the x, y, and z directions. Motion control 140 can also be configured to rotate the dental prosthesis and/or the one or more coloring fluid outlets based at least on instructions from the CAM file. In some embodiments, coloring fluid controller 130 and motion controller 140 can be implemented as a single master controller.

Figure 2:
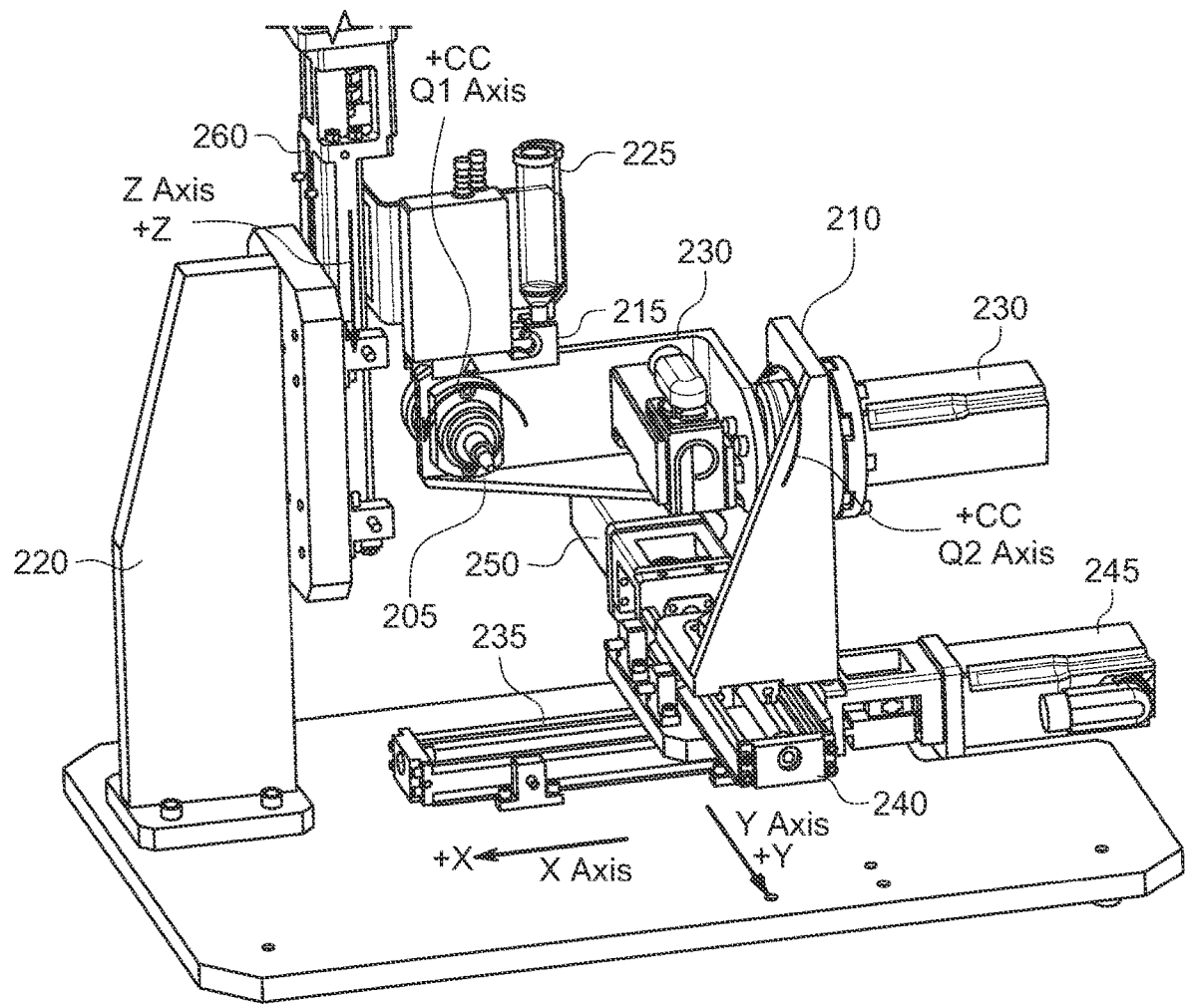
FIG. 2 is a perspective view of a printing system in accordance with some embodiments of the present disclosure.

FIG. 2 illustrates an auto coloring station 200 in accordance with some embodiments of the present disclosure. Coloring station 200 includes holding apparatus 205 being mounted on first frame assembly 210, coloring fluid dispensing block 215 being mounted on a second frame assembly 220, and coloring fluid cartridge 225. Holding apparatus 205 can rotate about an axis parallel to the y-axis as shown in FIG. 2. Holding apparatus 205 is configured to securely hold a dental prosthesis by the interior cavity of the dental prosthesis. In this way, the external surfaces of the dental prosthesis are fully exposed for coloring.

First frame assembly 210 includes motor 230 coupled to holding apparatus 205 such that when motor 203 is actuated, holding apparatus 205 is rotated about the x-axis. First frame assembly also includes tracks 235, 240 and motors 245, 250. Motor 245 is configured to translate holding apparatus 205 along the x-axis using track 235. Motor 250 is configured to translate holding apparatus 205 along the y-axis using track 240. The combinations of tracks 235, 240 and motors 245, 250 enable holding apparatus 205 to be translated on the x-y plane. Second frame assembly 220 includes track 255 and a motor (not shown) that together can move holding apparatus 205 along the z-axis.

Coloring fluid dispensing block 215 includes one or more outlets (not visible) on the underside of dispensing block 215. Coloring fluid cartridge 225 can be replaced with a series of coloring fluid cartridges, each containing a different coloring fluid color. The number of coloring fluid (e.g., ink) cartridges in the series can range from 1-64 cartridges. For example, the series can have 16 different color cartridges. Each coloring fluid cartridge can be fluidically coupled to an coloring fluid outlet. In some embodiments, the one or more outlets can be inkjet printheads, nozzles, openings, or other types of coloring fluid depositing devices.

Auto coloring station 200 also includes an coloring fluid controller (not shown) and a motion controller (also not shown). The coloring fluid controller is configured to control the rate and volume of the coloring fluid being dispensed. The motion controller is configured to control the translation and rotation of holding apparatus 205 through the control of motors 230, 245, 250, and also the motor coupled to track 260, which controls the translation in the z-direction. Each of the controllers is configured to control one or more of the motors to translate and/or rotate holding apparatus 205 and/or dispensing block 215 based on instructions of a CAM file.

Figure 3:
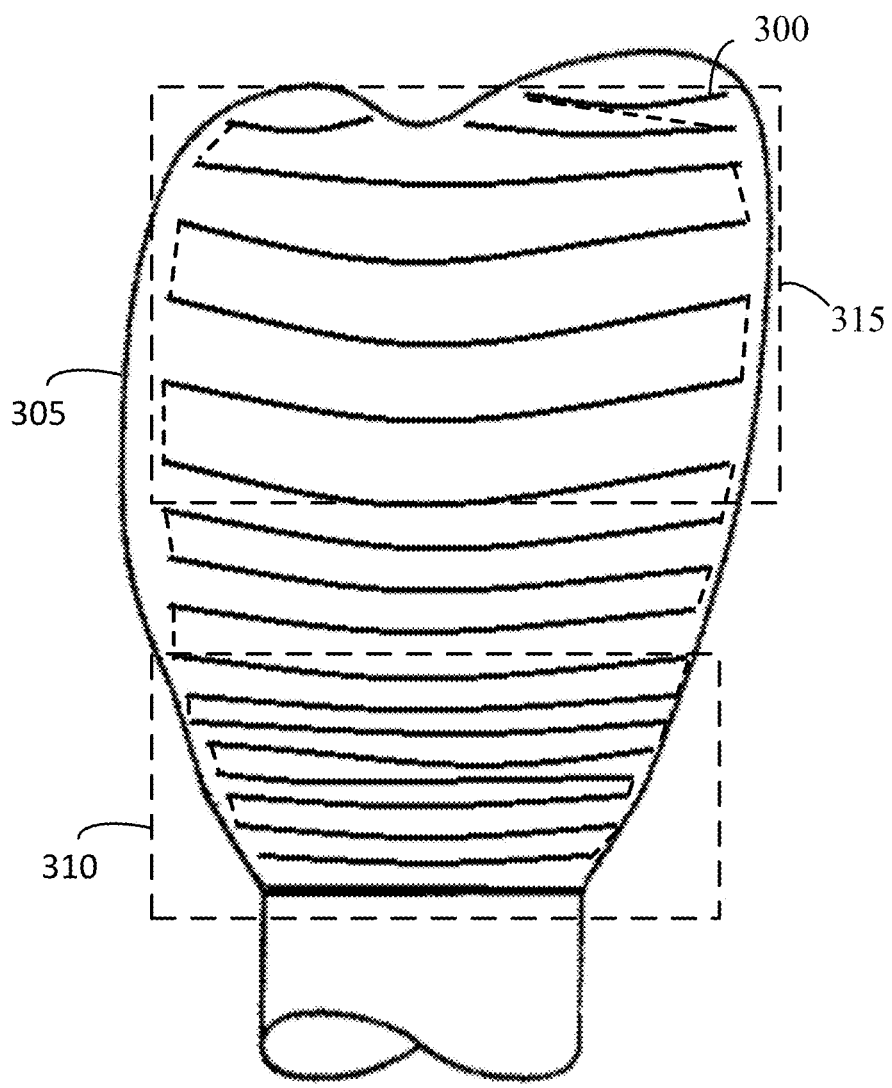
FIGS. 3, 4, and 5 illustrate example printing paths generated by a CAM file generator in accordance with some embodiments of the present disclosure.

FIG. 3 illustrates an example printing path 300 generated by a CAM file generator (e.g., generator 115) or a human ceramicist for a dental prosthesis 305 in accordance with some embodiments of the present disclosure. Printing path 300 can be generated using two or more inputs. For example, a first input can have one or more color values, which can be provided by the dental practitioner or by an automatic shade/color reader. For example, the dental practitioner can manually enter a shade value of A2. Alternatively, the dental practitioner can use a color reader to scan a sample to obtain one or more color values, which will be use as the input to CAM file generator 115. The second input can be a digital 3D model of the patient's dental prosthesis (e.g., a crown). Given the color value and the 3D model of the dental prosthesis, the CAM file generator can automatically generate printing path 300 specifically for the dental prosthesis. As shown, printing path 300 is denser at bottom region 310 of the dental prosthesis than top (e.g., occlusal) region 315. In other words, printing path 300 is spaced farther apart in region 315 than in region 310. This is due to the color gradient being darker near the gumline than the top of a natural tooth. Printing path 300 can include many print locations, which can have coordinates that enable the location to be precisely mapped with respective the surface of the dental prosthesis.

Figure 4:
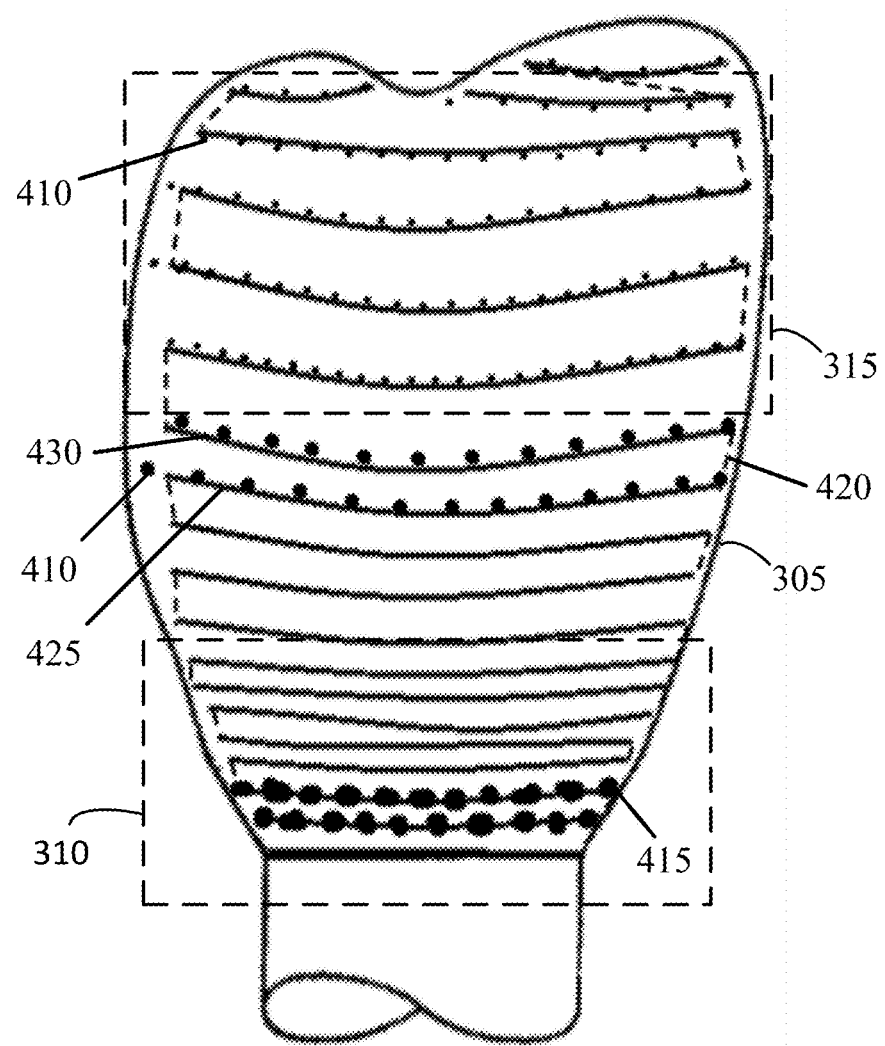

FIG. 4 illustrates the coloring fluid drop size along printing path 300 in accordance with some embodiments of the present disclosure. In some embodiments, the coloring fluid drop size is smaller near the occlusal region 315 than the coloring fluid drop size in the gumline region 310. For example, at location 410, the coloring fluid drop size can be 30, which can be a unit of time the coloring fluid nozzle is open. At location 410, the coloring fluid drop size can be 50. And at location 415, the coloring fluid drop size can be 70. The combination of increasing drop size, tighter printing path, and increased printing frequency creates a darker color or shade. A gradual color gradient—lighter to darker—can be achieved by adjusting one or more of the spacing between printing path, coloring fluid drop size, and printing frequency, which is the spacing between coloring fluid drops or printing locations.

The coloring fluid drop size can be represented in unit of time the coloring fluid nozzle (e.g., outlet) remains open. In some embodiments, the coloring fluid nozzle and the coloring fluid cartridge can be under a constant pressure. When the nozzle is opened, the coloring fluid is pushed out of the nozzle due to the pressure. Each unit of time can range from 100-500 microseconds. In some embodiments, each unit of time is 250 microseconds. The longer the unit of time, the more volume of coloring fluid is dispensed. The coloring fluid drop size can also be alternatively represented as an coloring fluid drop volume (e.g., microliter, nanoliter).

Figure 5:
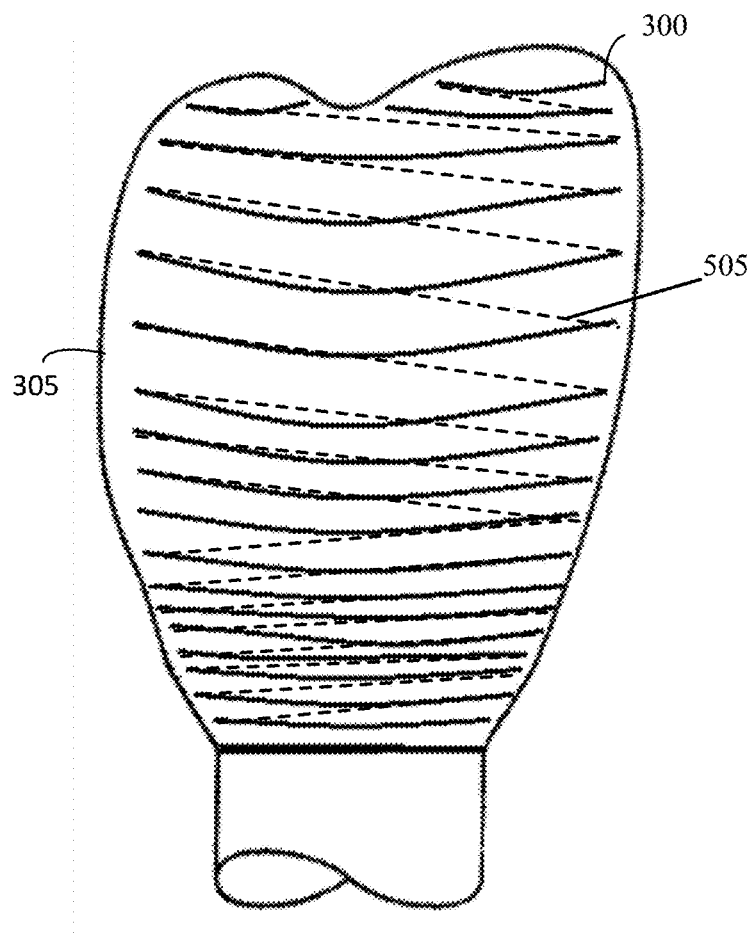

Printing path 300 can have a horizontal pattern as shown. Alternatively, printing path 300 can have a vertical, diagonal, or circular printing pattern. The transition between two printing paths can be vertical or diagonal. For example, transition path 420 can vertical or can take the shortest path possible between path lines 425, 430. Alternatively, printing path 300 can have a diagonal transition 505 as shown in FIG. 5. The printing path can also be continuous on a single line until a single path makes a complete revolution. For example, the dental prosthesis can be a crown of a molar with four sides. Each printing path can be a single line around all four sides of the crown. Once the coloring fluid is printed on all four sides, the next line can be printed continuously on all four sides.

Figure 6:
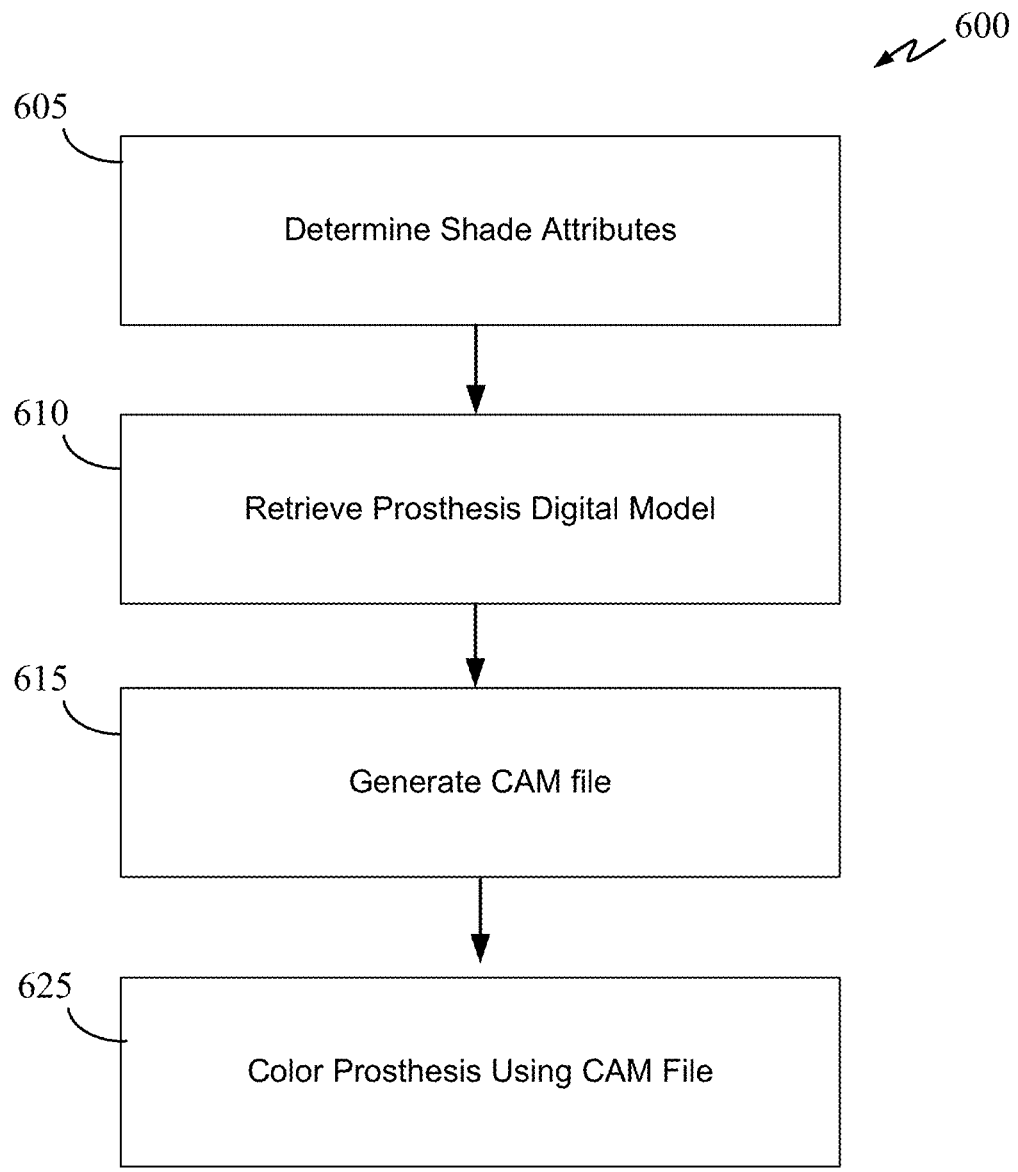
FIG. 6 is a flow chart illustrating an auto coloring process in accordance with some embodiments of the present disclosure.

FIG. 6 illustrates an automatic coloring process 600 in accordance with some embodiments of the present disclosure. Automatic coloring process 600 can be implemented at a dental office or a dental laboratory. Given a patient, process 600 assumes that a digital 3D model of the patient's dental prosthesis has already been created through one or more prior visits.

Process 600 starts at 605 where the shade attributes for the dental prosthesis are determined. The shade attributes can include one or more color values and gradient (e.g., directional change in intensity). The color values can be based on a VITA® color scale, for example, but not limited to the A1-D4 classic color scale. Other color scales can also be used.

The shade attributes for the dental prosthesis can be determined based on the color of one or more neighboring teeth. If the extracted tooth is available (the tooth that the dental prosthesis is replacing), the shade attributes can be determined using the extracted tooth. An average shade attributes from adjacent teeth can also be used. A shade attribute such as color can be determined visually by the dental practitioner. Alternatively, the color can be determined using a color reader.

At 610, the digital model of the dental prosthesis is retrieved. The digital model can be a computer-generated model (e.g., CAD model, 2D calibrated model) generated based on a patient's specific dentition data (e.g., oral scan data, mold impression). The digital model can also be a CNC (computer numerical control) simulated model or a 3D printing simulated model. The CNC simulated model can be a virtual model generated from a simulated CNC process. Additionally, the digital model can be a virtual model generated from a simulated 3D printing process.

At 615, a CAM file is generated based on the determined shade attributes and the digital model of the dental prosthesis. The CAM file can be generated using a combination of algorithms having coloring fluid dispensing and gradient generation modelers (e.g., CAM generator 115) that take into account the 3D model of the dental prosthesis, the one or more color values, and gradient extracted at 605. The CAM file can include a color dispensing plan, which defines the printing path, the coloring fluid drop size, coloring fluid drop volume, and the coloring fluid dispensing frequency. The CAM file generation process can be done locally or remotely at a dental laboratory or on the cloud. After the CAM file is generated, the dental prosthesis can be colored at 625 using printing system 120.

Since the CAM file generation process can be done remotely, printing system 120 can be a chairside system. For example, the dental practitioner can use printing system 120 to download the CAM file for the patient and color the dental prosthesis on demand. Alternatively, the CAM file can be uploaded into the memory of printing system 120 using a USB memory stick.

Figure 7:
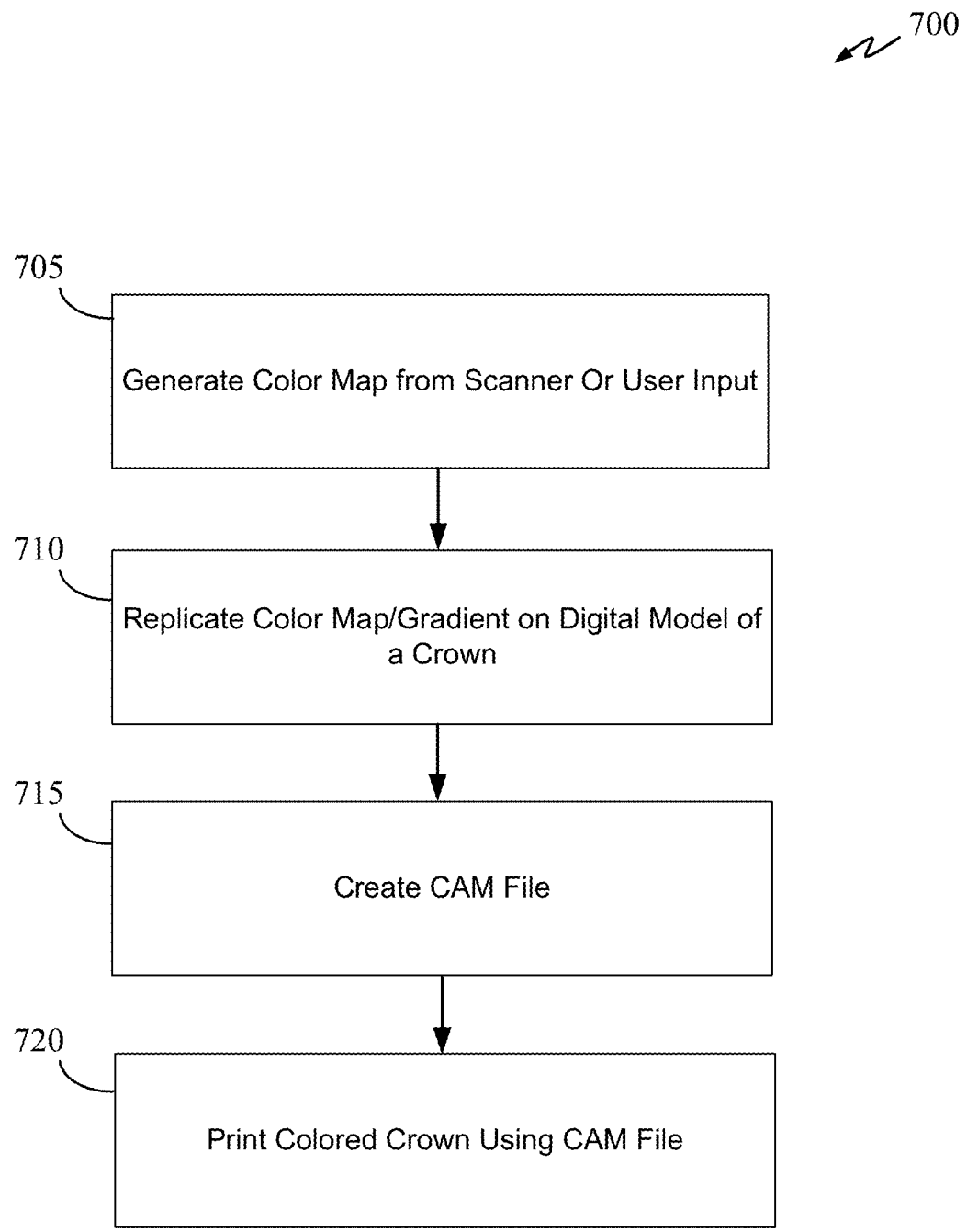
FIG. 7 is a flow chart illustrating another auto coloring process in accordance with some embodiments of the present disclosure.
Figures 8A, 8B:
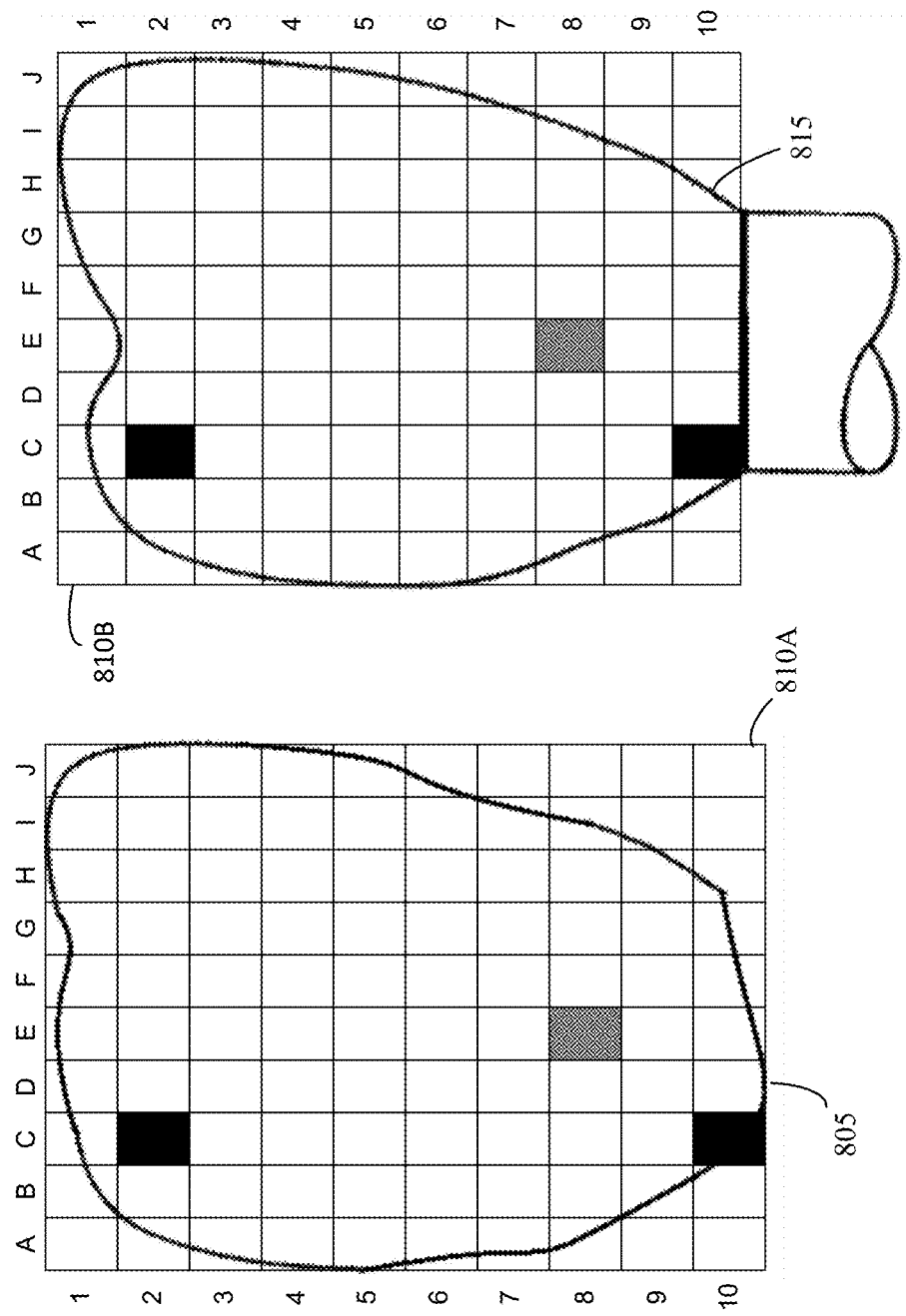
FIGS. 8A and 8B visually illustrate the color reading and matching process in accordance with some embodiments of the present disclosure.

FIG. 7 illustrates an auto coloring process 700 in accordance with some embodiments of the present disclosure. FIGS. 8A and 8B illustrate a color mapping process 800 in accordance with some embodiments of the present disclosure. FIGS. 7, 8A, and 8B will be discussed concurrently. Process 700 starts at 705 where the color map for a dental prosthesis is generated. The initial color map of a sample tooth (e.g., extracted tooth to be replaced, a sample tooth guide, an adjacent tooth) can be obtained by scanning the sample tooth using a color/color reader. The scanner can be configured to output a single overall color value. Alternatively, the scanner can be configured to output one or more color values for each region of the sample tooth.

Referring to FIG. 8A, which illustrates a sample tooth 805 divided into a plurality of sections (i.e., A1 through J10) by the color mapping algorithm. Sample tooth 805 can be the patient's tooth adjacent to the prep-space where the dental prosthesis will be installed. Sample tooth 805 can also be the tooth extracted from the prep-space. In some embodiments, the color reader can be configured to measure and provide one or more color attributes (e.g., color value, intensity) for each block on grid 810. In this way, a detailed color map of the tooth to be reproduced is generated. The At 710, the color map generated at 705 is replicated on a digital model 815 of the dental prosthesis. Digital model 815 can be generated using dentition data from an intraoral scan or from an AI-generated crown model. In some embodiments, the color attribute of each block of grid 810A is directly transferred to the corresponding block of grid 815 on the digital model. This can be done by overlaying the grid onto the digital model of the dental prosthesis. For example, even though the overall shapes of sample tooth 805 and crown 815 are different, the color map can be replicated by transferring the attribute of each block in grid 810a to the corresponding block in grid 810B. In this way, crown 815 will have the same color gradient as sample tooth 805. For example, the color attribute of block C2 of grid 810A is directly transferred to block C2 of grid 810B. Similarly, attributes of blocks E8 and C10 of grid 810A are directly transferred to blocks E8 and C10 of grid 810B.

The color mapping process at 710 can use a higher resolution grid. For example, instead of a 10×10 grid, a 20×20 or 50×100 grid can also be used. In this way, the color mapping process can be expanded beyond a single color/shade value.

At 715, the CAM file can be generated based on the color map for the dental prosthesis. The color attribute of each block of grid 810B can determine the coloring fluid drop size, print frequency or the number of printing passes, and the printing path. For example, block C10 of grid 810B may require an coloring fluid drop size of 70 and two separate passes. In other words, block C10 requires two printing passes, each with a drop size of 70, for example. The color attribute also determines the color/shade to be used. The final shade may require several printing passes, with each pass using a different or the same color or shade. For example, the first pass can use coloring fluid from the grey coloring fluid cartridge, the second pass can use coloring fluid from the yellow-grey coloring fluid cartridge, and the third pass can use coloring fluid from the grey coloring fluid cartridge again.

For each block of grid 810B, the CAM file can also include one or more motion commands that control the movement and translation of the dental prosthesis to be painted and/or the one or more coloring fluid outlets. For example, at block E8, the dental prosthesis may be rotated by 15 degrees clockwise along the x-axis and 5 degrees clockwise along the y-axis. The motion commands are created such that the printing surface of the dental prosthesis is substantially perpendicular to coloring fluid dispensing nozzle. This allows the coloring fluid to be properly absorbed by the ceramic instead of rolling off the prosthesis' surface. In some embodiments, certain blocks of grid 810B have no data. This means the printing process can proceed to the next block or the steps of the previous block can be repeated. In some embodiments, where the color attribute is present and the motion command is absent, the dental prosthesis can remain in the same space without any translation or rotation while the color is printed based on the color attribute of the block.

At 720, the dental prosthesis is printed based on the CAM file generated at 715. Depending on the color attribute of each block or a group of blocks, one or more colors can be deposited onto the surface of the dental prosthesis being covered by the block or group of blocks. In some embodiments, the color/shade of each block of grid 810B can be reproduced using three or more basic foundation colors. In other words, using a combination of the coloring fluid drop size (e.g, coloring fluid drop volume), the number of printing passes, and the use of one or more foundation colors, the color of any block of grid 810A or 810B can be reproduced accurately. In some embodiments, the foundation colors can be grey-based, red-based, and yellow-based.

Alternatively, four or more foundation colors can be used such as the addition of white and brown-based colors. For example, the color of block C10 can be created by performing the following printing sequence: $1^{st}$ pass—drop size 40, grey; $2^{nd}$ pass—drop size 50, yellow; $3^{rd}$ pass—drop size 60, red-brown. The foundation colors can also be red, green and blue (RGB) similar the color scheme of display systems.

Figure 9:
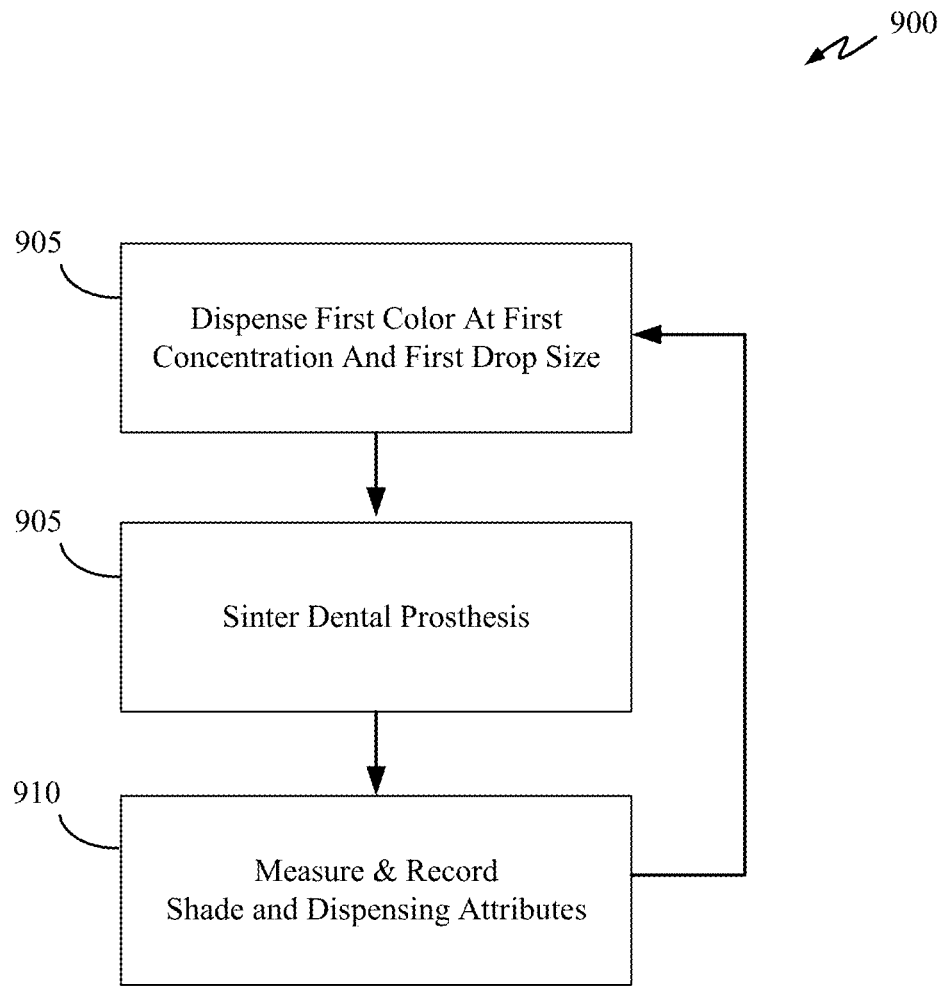
FIGS. 9 and 10 are flow charts illustrating processes for developing color relationship tables in accordance with some embodiments of the present disclosure.

FIG. 9 illustrates a process 900 for building a table showing the relationship between color values and certain coloring fluid printing attributes in accordance with some embodiments of the present disclosure. Process 900 can be used to create, through experimentation, a relationship table between various attributes such as color value, drop size, number of printing passes, and coloring fluid concentration. Process 900 can start by selecting a first coloring fluid color and concentration sufficient to penetrate 0.5 mm under the surface of the ceramic at a drop size of 30. Once the coloring fluid color and coloring fluid concentration is selected, the coloring fluid can be dispensed at a certain starting drop size such as, but not limited to, a drop size 30 at 905.

As previously mentioned, the coloring fluid drop size can be represented in unit of time the coloring fluid nozzle (e.g., outlet) remains open. For example, a unit of time can range from 100-500 microseconds. The longer the unit of time, the more volume of coloring fluid is dispensed. The coloring fluid drop size can also be represented as a volume such as microliter or nanoliter. In this example, dispensing block 215 can be configured to dispense fluid by an exact volume instead of by an amount of time the outlet is opened.

At 905, the dental prosthesis on which the coloring fluid is dispensed is placed into a sintering oven to undergo a sintering process. After the sintering process is completed, a color reading is taken at 910, and the color value is recorded to the table along with the coloring fluid drop size and concentration values.

The process is then repeated using a different fluid drop size and/or concentration. In some embodiments, the coloring fluid drop size is increased and dispensed on a new dental prosthesis. Next, the dental prosthesis is sintered, and the color reading is then measured and recorded.

Different drop sizes can also be printed on various parts of a dental prosthesis to increase the efficiency of the color experiment. For example, a fluid drop size of 30 can be printed on the left side of the dental prosthesis. And on the right side of the dental prosthesis, another fluid drop size (e.g., 40, 50, 70) can be used. In this way, a single dental prosthesis can be used to generate several data points.

Figure 10:
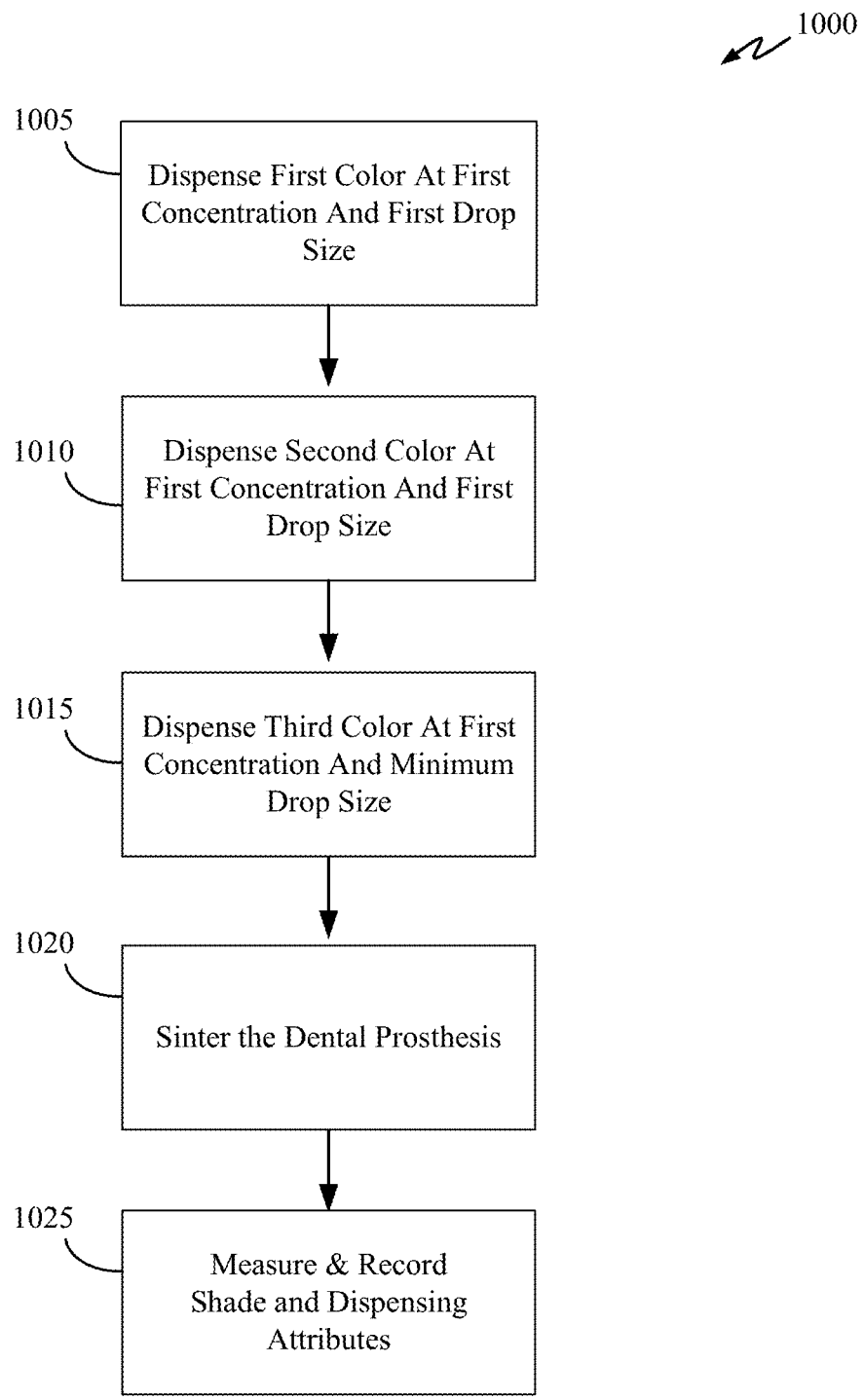

FIG. 10 illustrates a process 1000 for building a table showing the relationship between color values and certain coloring fluid printing attributes in accordance with some embodiments of the present disclosure. Sub-process 1005 starts by dispensing a first coloring fluid at a first drop size and a first concentration that is sufficient to penetrate 0.5 mm under the surface of the dental prosthesis. At 1010, a second coloring fluid of the same or different drop size and the same or different concentration is deposited over the same region of the dental prosthesis. At 1015, a third coloring fluid of the same or different drop size and the same or different concentration is deposited over the same region of the dental prosthesis. At 1020, after the third drop is deposited, the dental prosthesis is sintered. At 1025, a color reading is taken, and the color value is recorded to the table along with the plurality of dispensing and coloring fluid attributes such as, but not limited to, color, drop size, concentration, drop location, motion commands, position of the dental prosthesis relative to dispensing outlets (e.g., spray nozzles, inkjet dispensing holes).

Similar to process 900, sub-processes 1005, 1010, 1015 can be repeated on different regions of the dental prosthesis before it is sintered. In this way, several color data points can be generated for the color lookup table.

Figure 11:
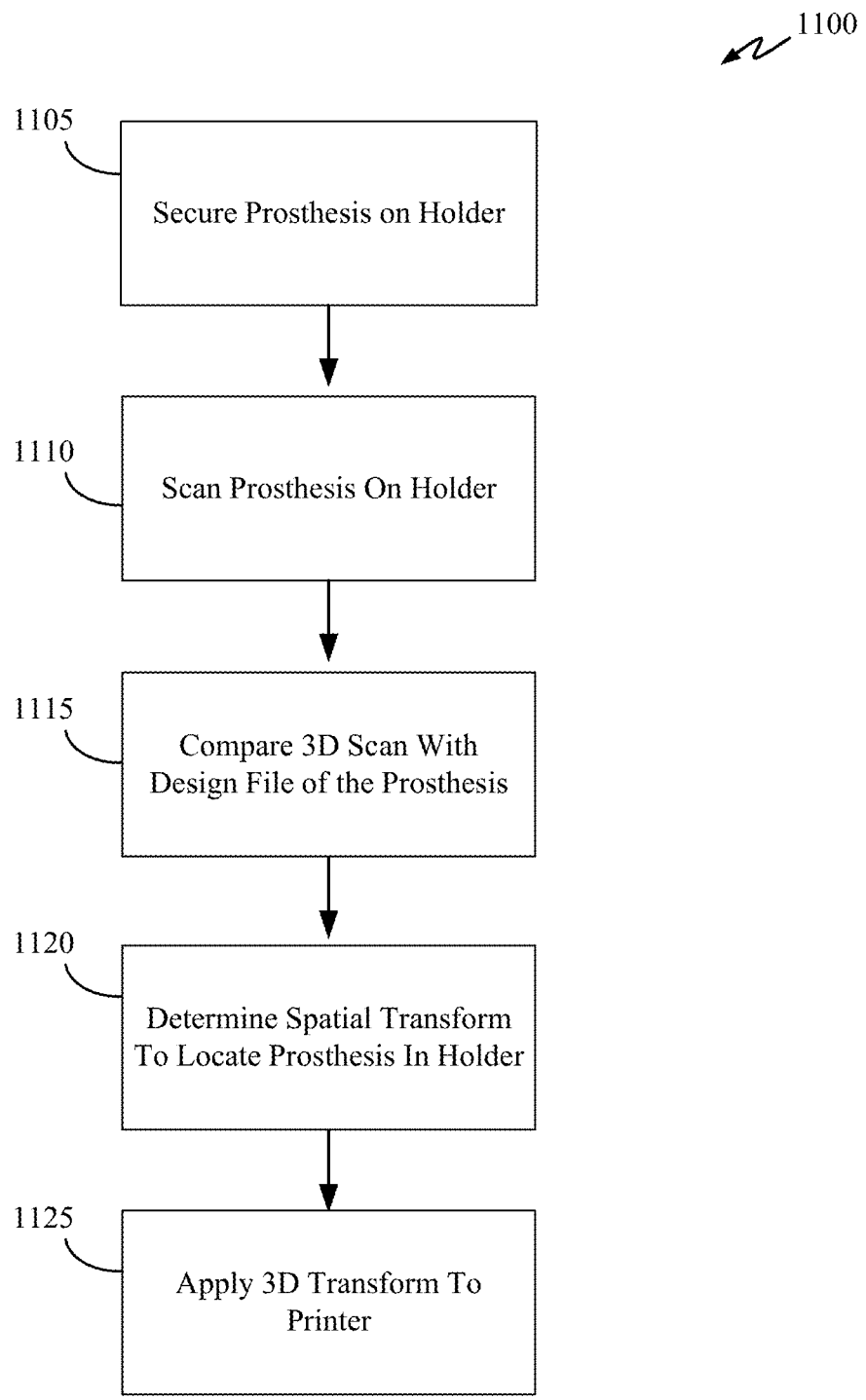
FIG. 11 is a flow chart illustrating a prosthesis registration process in accordance with some embodiments of the present disclosure.

FIG. 11 illustrates a prosthesis registration process 1100 in accordance with some embodiments of the present disclosure. Registration process 1100 starts at 1105 where the dental prosthesis is placed and secured into a holder (e.g., grippers, fingers, clamps). In some embodiments, the gripper (e.g., gripper robot) can be configured to pick up and secure the dental prosthesis automatically onto the holder/gripper using vision technology for example. Alternatively, the dental prosthesis can be manually placed into the holder.

At 1110, the dental prosthesis is scanned using a 3D scanner (e.g., scanner 1120 to generate a 3D data set of the dental prosthesis while it is being secured in the holder. Prior to the scanning process, the holder's position can be reset to an origin point or a point in which its spatial coordinates with respect to a reference point (e.g., gripper's origin, spray block) are known.

At 1115, the 3D data set from the scanner is compared with the 3D design file of the same dental prosthesis. This is the 3D design file used to fabricate the dental prosthesis. The comparison can be done using a best-fitting algorithm, which can be integrated into the scanner (e.g., scanner 112). Alternatively, the best-fitting algorithm can be part of cam file generator 115 or printing system 120.

At 1120, using the 3D design file as a reference, the spatial transform needed to locate and fit the 3D design file onto the scanned 3D data set is determined. For example, to determine the spatial transform, the dental prothesis model in the 3D design file can be translated and rotated until it fits onto the 3D scanned model. The spatial transform can be defined by the combination of translations and/or rotations needed to fit the model of the scanned 3D data set with the model of the 3D design file. In some embodiments, the spatial transform data can be generated by standard transformation algorithm(s) incorporated into scanner 112, CAM file generator 115, and/or printing system 120.

At 1125, the 3D transform data is then transferred to the printer (e.g., CNC machine, robot), which then use the 3D transformation data to align the printer's coordinates to match the design. In some embodiments, a G-code (or other CNC language) is prepared using the newly aligned coordinates to specify the minimum distance between the crown surface and the printhead. In other words, the 3D transformation data is used to generate the G-code, using CAM file generator 115, such that the optimum distance (e.g., minimum) between the print head (e.g., printing nozzle) and the print surface of the dental prosthesis is achieved throughout the printing process. In other words, the coordinates (zero offsets) of the printing machine is adjusted to coincide with the design coordinates by comparing the 3D scanned model with the 3D design model and then performing the appropriate 3D transformation. In this embodiment, the CAM file (e.g., G-code) contains built-in motion commands to ensure that the printhead is always at the optimum distance at every printing location. In this way, there is no need to monitor the distance between the surface and the printhead (using a distance detector) since the G-code already incorporated the 3D transformation data to adjust for any misalignment that may have occurred when the dental prosthesis is inserted into the holder and/or changes in the contour of the surface of the dental prosthesis.

Figure 12:
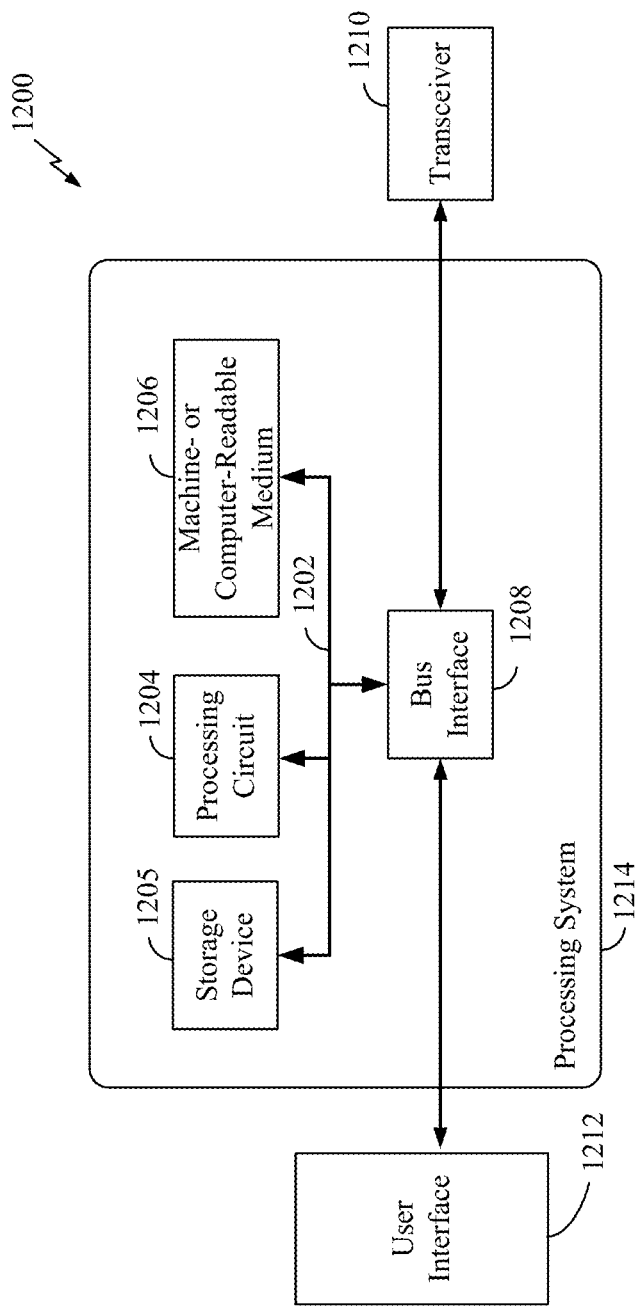
FIG. 12 is a block diagram illustrating an example of a hardware implementation of the auto coloring system shown in FIG. 1 in accordance with some embodiments of the disclosure.

FIG. 12 illustrates an overall system or apparatus 1200 in which system 100 and processes 600, 700, 900, 1000, and 1100 can be implemented and the user interface 1212 can be generated. In accordance with various aspects of the disclosure, an element, or any portion of an element, or any combination of elements may be implemented with a processing system 1214 that includes one or more processing circuits 1204. The processing circuits 1204 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1204 may be used to implement any one or more of the processes described above and any processes inherent in the system described above and illustrated in FIGS. 1 through 11.

In the example of FIG. 12, the processing system 1214 may be implemented with a bus architecture, represented generally by the bus 1202. The bus 1202 may include any number of interconnecting buses and bridges depending on the specific application of the processing system 1214 and the overall design constraints. The bus 1202 coloring fluids various circuits including one or more processing circuits (represented generally by the processing circuit 1204), the storage device 1205, and a machine-readable, processor-readable, processing circuit-readable or computer-readable media (represented generally by a non-transitory machine-readable medium 1206.) The bus 1202 may also coloring fluid various other circuits such as timing sources, peripherals, voltage regulators, and power management circuits, which are well known in the art, and therefore, will not be described any further. The bus interface 1208 provides an interface between bus 1202 and a transceiver 1210. The transceiver 1210 provides a means for communicating with various other apparatus over a transmission medium. Depending upon the nature of the apparatus, a user interface 1212 (e.g., keypad, display, speaker, microphone, touchscreen, motion sensor) may also be provided.

The processing circuit 1204 is responsible for managing the bus 1202 and for general processing, including the execution of software stored on the machine-readable medium 1208. The software, when executed by processing circuit 1204, causes processing system 1214 to perform the various functions described herein for any particular apparatus. Machine-readable medium 1208 may also be used for storing data that is manipulated by processing circuit 1204 during the execution of the software.

One or more processing circuits 1204 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1208. The machine-readable medium 1208 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1208 may reside in the processing system 1214, external to the processing system 1214, or distributed across multiple entities including the processing system 1214. The machine-readable medium 1208 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for automatically coloring a dental prosthesis, the method comprising:
    retrieving a computer-aided manufacturing (CAM) file for the dental prosthesis;
    moving the dental prosthesis with respect to a printing nozzle based on instructions from the CAM file, wherein moving the dental prosthesis comprises at least one of translation and rotation; and
    dispensing coloring fluid on the dental prosthesis based at least on instructions from the CAM file, wherein the coloring fluid has a fluid drop size based at least on a print location of a printing path with respect to the dental prosthesis, wherein the coloring fluid drop size is smallest near an occlusal surface of the dental prosthesis and largest near a gumline area of the dental prosthesis, and wherein the CAM file comprises motion commands configured to automatically adjust a distance between the printing nozzle and the dental prosthesis to obtain an optimum distance therebetween.

2. The method of claim 1, wherein the instructions from the CAM file includes defining one or more of a printing path, coloring fluid color, print frequency, and motion commands.

3. The method of claim 1, wherein moving the dental prosthesis comprises using a mechanical-motion assembly is coupled to a holding apparatus, wherein the mechanical-motion assembly comprises one or more motors, and wherein a motion controller is configured to control the mechanical-motion assembly to move the dental prosthesis based at least on the motion commands.

4. The method of claim 1, wherein retrieving the CAM file comprises:
    determining, using a color reader, a color profile of a sample;
    generating the CAM file of the dental prosthesis, based at least on a dentition profile of a patient and the color profile of the sample, to re-create the color profile of the sample on the dental prosthesis.

5. The method of claim 4, wherein generating the CAM file comprises:
- assigning a color value to each cell of a color grid of the sample; and
- transferring the color value of each cell to a cell of a color grid of the dental prosthesis.

6. The method of claim 1, wherein dispensing coloring fluid comprises dispensing coloring fluid from one or more coloring fluid cartridges based on the CAM file, the one or more coloring fluid cartridges comprising a first, second, and a third coloring fluid cartridges, wherein the first coloring fluid cartridge comprises a red-based color, the second coloring fluid cartridge comprises a yellow-based color, and the third coloring fluid cartridge comprises a gray-based color.

7. The method of claim 1, wherein the coloring fluid supplied to the printing nozzle is under a constant pressure, and the coloring fluid is dispensed from the printing nozzle by opening the printing nozzle.

8. The method of claim 7, wherein the coloring fluid drop size is determined by the amount of time the printing nozzle is in an open position.

9. The method of claim 8, wherein the printing nozzle remains in an open position for a time period from 100 to 500 microseconds.

10. A method for automatically coloring a dental prosthesis, the method comprising:
- retrieving a computer-aided manufacturing (CAM) file for the dental prosthesis;
- moving the dental prosthesis with respect to a printing nozzle based on instructions from the CAM file, wherein moving the dental prosthesis comprises at least one of translation and rotation; and
- dispensing coloring fluid on the dental prosthesis based at least on instructions from the CAM file, wherein the coloring fluid has a fluid drop size based at least on a print location of a printing path with respect to the dental prosthesis, wherein dispensing coloring fluid comprises dispensing coloring fluid from one or more coloring fluid cartridges based on the CAM file, the one or more coloring fluid cartridges comprising a first, second, and a third coloring fluid cartridges, wherein the first coloring fluid cartridge comprises a red-based color, the second coloring fluid cartridge comprises a yellow-based color, and the third coloring fluid cartridge comprises a gray-based color, and wherein the CAM file comprises motion commands configured to automatically adjust a distance between the printing nozzle and the dental prosthesis to obtain an optimum distance therebetween.

11. A method for automatically coloring a dental prosthesis, the method comprising:
- retrieving a computer-aided manufacturing (CAM) file for the dental prosthesis;
- moving the dental prosthesis with respect to a printing nozzle based on instructions from the CAM file, wherein moving the dental prosthesis comprises at least one of translation and rotation; and
- dispensing coloring fluid on the dental prosthesis based at least on instructions from the CAM file, wherein the coloring fluid has a fluid drop size based at least on a print location of a printing path with respect to the dental prosthesis, wherein the coloring fluid supplied to the printing nozzle is under a constant pressure, and the coloring fluid is dispensed from the printing nozzle by opening the printing nozzle, and wherein the CAM file comprises motion commands configured to automatically adjust a distance between the printing nozzle and the dental prosthesis to obtain an optimum distance therebetween.

12. The method of claim 11, wherein the coloring fluid drop size is determined by the amount of time the printing nozzle is in an open position.

13. The method of claim 12, wherein the printing nozzle remains in an open position for a time period from 100 to 500 microseconds.

* * * * *